United States Patent
Dykstra et al.

(10) Patent No.: US 10,338,247 B2
(45) Date of Patent: Jul. 2, 2019

(54) MICROSEISMIC MONITORING SENSOR UNCERTAINTY REDUCTION

(71) Applicant: Halliburton Energy Services, Inc., Houston, TX (US)

(72) Inventors: Jason D. Dykstra, Spring, TX (US); Zhijie Sun, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/525,336

(22) PCT Filed: Dec. 23, 2014

(86) PCT No.: PCT/US2014/072017
§ 371 (c)(1),
(2) Date: May 9, 2017

(87) PCT Pub. No.: WO2016/105351
PCT Pub. Date: Jun. 30, 2016

(65) Prior Publication Data
US 2017/0329029 A1    Nov. 16, 2017

(51) Int. Cl.
*G01V 1/28* (2006.01)
*G01V 1/42* (2006.01)

(52) U.S. Cl.
CPC ............... *G01V 1/288* (2013.01); *G01V 1/42* (2013.01); *G01V 2210/1234* (2013.01);
(Continued)

(58) Field of Classification Search
CPC .... G01V 1/288; G01V 1/42; G01V 2210/667; G01V 2210/1234; G01V 2210/1425; G01V 2210/1429
(Continued)

(56) References Cited

U.S. PATENT DOCUMENTS 2,747,172 A    5/1956   Bayhi
6,814,160 B1   11/2004  Scott
(Continued)

FOREIGN PATENT DOCUMENTS

CA    2896497    7/2014
CA    2915625    1/2015
(Continued)

OTHER PUBLICATIONS

International Patent Application No. PCT/US2014/072017, "International Search Report and Written Opinion", dated Aug. 26, 2015, 9 pages.
(Continued)

*Primary Examiner* — Daniel L Murphy
(74) *Attorney, Agent, or Firm* — Kilpatrick, Townsend & Stockton LLP

(57) ABSTRACT

Uncertainty in microseismic monitoring sensor data can be reduced. A computing device can receive information about at least one sensor that is monitoring a subterranean formation, including a location, after a fracturing fluid is introduced into the formation. The computing device can also receive information about a microseismic event and determine a seismic ray bath between a location of the event and the at least one sensor, and an uncertainty value of the location based on information about the formation and the information about the event. The computing device can determine a total uncertainty value associated with the locations of a plurality of microseismic events, including the microseismic event. The computing device can determine a solution to an objective function based on the total uncertainty value and a number of sensors. The computing device can determine a new location of the at least one sensor based on the solution.

20 Claims, 6 Drawing Sheets

(52) U.S. Cl.
CPC ............... *G01V 2210/1425* (2013.01); *G01V 2210/1429* (2013.01); *G01V 2210/667* (2013.01)

(58) Field of Classification Search
USPC .......................................................... 367/38
See application file for complete search history.

(56) References Cited

U.S. PATENT DOCUMENTS

| | | |
|---|---|---|
| 2003/0050758 A1 | 3/2003 | Soliman et al. |
| 2008/0004847 A1 | 1/2008 | Bradford et al. |
| 2008/0149329 A1 | 6/2008 | Cooper et al. |
| 2008/0164021 A1 | 7/2008 | Dykstra et al. |
| 2009/0059721 A1 | 3/2009 | Simon et al. |
| 2009/0166029 A1 | 7/2009 | Maksimenko et al. |
| 2009/0315539 A1 | 12/2009 | Helwig et al. |
| 2009/0316524 A1 | 12/2009 | Tenghamn et al. |
| 2010/0252268 A1 | 10/2010 | Gu et al. |
| 2010/0262373 A1 | 10/2010 | Khadhraoui et al. |
| 2010/0307755 A1 | 12/2010 | Xu et al. |
| 2011/0120702 A1 | 5/2011 | Craig et al. |
| 2012/0300582 A1 | 11/2012 | Winter et al. |
| 2013/0081805 A1 | 4/2013 | Bradford et al. |
| 2013/0090902 A1 | 4/2013 | Yao et al. |
| 2014/0100786 A1 | 4/2014 | Ma et al. |
| 2014/0372089 A1 | 12/2014 | Weng et al. |
| 2015/0066458 A1* | 3/2015 | Coles ...................... G01V 1/42 703/2 |

FOREIGN PATENT DOCUMENTS

| | | |
|---|---|---|
| WO | 2014105659 | 7/2014 |
| WO | 2016080980 | 5/2016 |
| WO | 2016080981 | 5/2016 |

OTHER PUBLICATIONS

Canadian Patent Application No. 2,966,188, Office Action dated Feb. 8, 2018, 4 pages.
Canadian Patent Application No. 2,966,188, "Office Action", dated Jan. 3, 2019, 4 pages.
Swanson et al., Report of Investigations 9395, "Accuracy and Precision of Microseismic Event Locations in Rock Burst Research Studies", United States Department of Interior, pp. 46, 1992.
Wright et al., "Downhole Tiltmeter Fracture Mapping: Finally Measuring Hydraulic Fracture Dimensions", SPE Western Regional Conference, Society of Petroleum Engineers, Inc., 1998.

* cited by examiner

MICROSEISMIC MONITORING SENSOR UNCERTAINTY REDUCTION

CROSS-REFERENCE TO RELATED APPLICATIONS

This is a U.S. national phase under 35 U.S.C. 371 of International Patent Application No. PCT/US2014/072017 titled "Microseismic Monitoring Sensor Uncertainty Reduction" and filed Dec. 23, 2014, the entirety of which is incorporated herein by reference.

TECHNICAL FIELD

The present disclosure relates generally to systems and methods for analyzing a subterranean formation. More specifically, but not by way of limitation, this disclosure relates to microseismic monitoring.

BACKGROUND

A well system (e.g., oil or gas wells for extracting fluids from a subterranean formation) can include a wellbore drilled into a formation. Hydraulic fracturing operations can be performed on the wellbore to increase production by pumping a hydraulic fluid down the cased wellbore into the formation at pressures and injection rates sufficient to cause the formation rock to initiate and propagate a hydraulic fracture (or induced fracture) into the subterranean formation. Accurate estimation of the geometry of the hydraulic fracture can improve production economics by increasing reservoir productivity and reducing completion costs.

DETAILED DESCRIPTION

Certain aspects and examples of the disclosure are directed to a system and method for determining an optimal placement of sensors, for example geophones or tiltmeters, to generate a data set used to update, and in some aspects calibrate, a fracture model. A well-updated and well-calibrated fracture model can provide an accurate estimation of the geometry of a hydraulic fracture. Accurate estimation of the geometry of the hydraulic fracture can improve production economics by increasing reservoir productivity and reducing completion costs.

Hydraulic fracturing operations can cause microseismic events to occur in the subterranean formation. Microseismic events in subterranean formations are shear events that are slippages along hydraulic fractures as well as natural fractures, bedding, faults, dewatering features, and other planes of weakness. During a hydraulic fracturing operation, the formation stress and the pore pressure in the formation surrounding a hydraulic fracture are increased. Both the pore pressure increase and formation can cause microseismic events to occur in the subterranean formation proximate to the tip of a hydraulic fracture. A computing device can receive information or data from the sensors that monitor these microseismic events and can determine microseismic monitoring results using the data and additional information about the formation. For example, the computing device can determine the location of the microseismic event based on the data.

The computing device can use the data, or in some aspects the microseismic monitoring results, to update the fracture model. The data and the microseismic monitoring results determined using the data can have a large level of uncertainty. The uncertainty can be caused by the distance between the sensors and the microseismic events, the quality of the velocity model used by the computing device to determine the microseismic monitoring results (e.g., the location of the microseismic event), and the signal processing algorithm used by the computing device to determine the microseismic monitoring results. The uncertainty of the data and the microseismic monitoring results can cause uncertainty in the fracture model. The computing device can reduce the uncertainty in the data and thereby reduce the uncertainty of the microseismic monitoring results by positioning the sensors at locations that reduce the uncertainty due to the distance between the sensors and the microseismic events.

Figure 1:
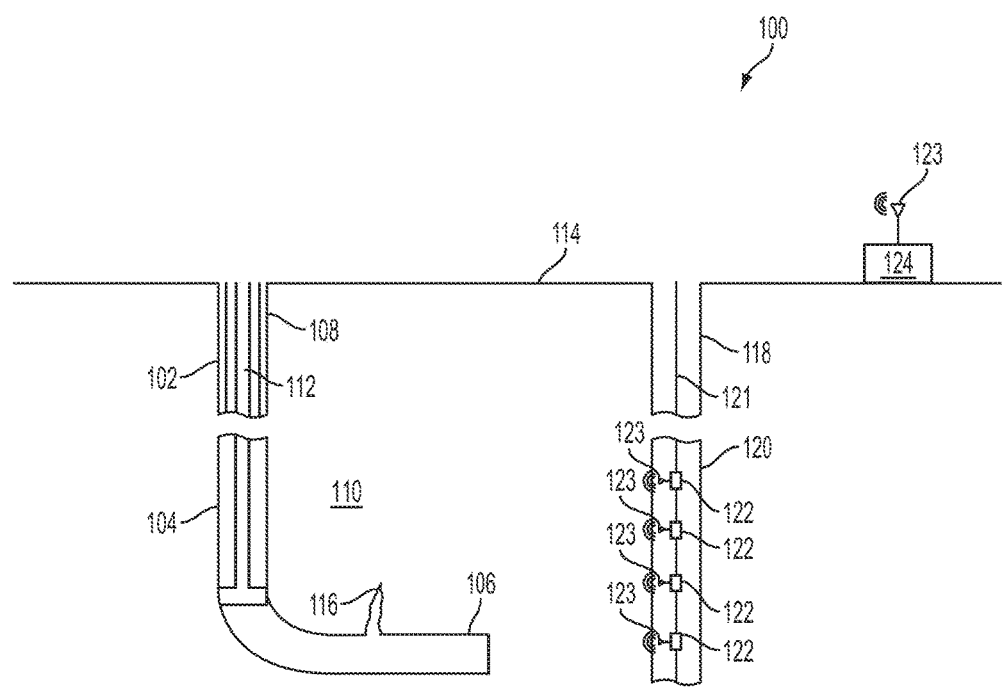
FIG. 1 is a schematic illustration of an active wellbore and a microseismic monitoring sensor uncertainty reduction system according to one aspect of the present disclosure.

FIG. 1 is a schematic illustration of a sensor uncertainty reduction system 100 according to one aspect. An active wellbore 102 extends through various earth strata. The active wellbore has a substantially vertical section 104 and a substantially horizontal section 106. The substantially vertical section 104 may include a casing string 108 cemented at an upper portion of the substantially vertical section 104. The substantially horizontal section 106 extends through a hydrocarbon bearing subterranean formation 110. A tubing string 112 extends from the surface 114 into the active wellbore 102. The tubing string 112 can provide a conduit for pumping a fracturing fluid into the active wellbore 102 to perform hydraulic fracturing operations on the active wellbore 102. The active wellbore 102 includes a hydraulic fracture 116 (or induced fracture) that extends from the substantially horizontal section 106. Proppant materials can be entrained in the fracturing fluid and deposited in the hydraulic fracture 116 to keep the hydraulic fracture 116 open.

The system 100 can include an observation wellbore 118 extending through various earth strata. The observation wellbore 118 has a substantially vertical section 120. Multiple geophones 122 are positioned on a tool string 121 deployed within the observation wellbore 118. In some aspects, transducers, tiltmeters or other suitable sensors may be used in place of the geophones 122. The geophones 122 can monitor microseismic events in the formation 110. For example, the geophones 122 can detect the arrival of the Primary (P) waves and the Secondary (S) waves of a microseismic event in the formation 110 during a hydraulic fracturing operation.

The geophones 122 can be communicatively coupled to a computing device 124. The computing device 124 can be positioned at the surface 114 or at a separate location. The computing device 124 can include a processor interfaced with other hardware via a bus. A memory, which can include any suitable tangible (and non-transitory) computer-readable medium, such as random-access memory ("RAM"), ROM, electrically erasable and programmable read-only memory ("EEPROM"), or the like, can embody program components that configure operation of the computing device 124. In some aspects, the computing device 124 can include input/output interface components (e.g., a display, keyboard, touch-sensitive surface, and mouse) and additional storage. The computing device 124 can transmit data to and receive data from the geophones 122 via a communication link 123. The communication link 123 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other aspects, the communication link 123 can be wired and can include interfaces such as Ethernet, USB, IEEE 1394, or a fiber optic interface. An example of the computing device 124 is described in further detail with respect to FIG. 3.

The computing device 124 can receive from geophones 122 raw signal data corresponding to the arrival times of the P-waves and S-waves associated with the microseismic event. The computing device 124 can calculate the difference between the travel times of the P-waves and S-waves using data associated with the formation 110 and an algorithm to determine a location of the microseismic event. The computing device 124 can use the location or the raw signal data to update or calibrate a fracture model that can predict a geometry (e.g., length or height) of the hydraulic fracture 116. For example, the fracture model can predict a length of a bi-wing hydraulic fracture using the Perkins-Kern-Nordgren (PKN) model.

There can be uncertainty in the raw signal data and the determined location caused by the distance between the geophones 122 and the microseismic events, the quality of the velocity model used by the computing device 124 to determine the location of the microseismic event, and the signal processing algorithm used by the computing device 124 to determine the location. The computing device 124 can determine the location for each of the geophones 122 that can reduce the uncertainty in the raw signal data received from the geophones 122. In some aspects, the computing device 124 can use the raw signal data from each of the geophones 122 and information about the formation to determine a seismic ray path between a microseismic event and each geophone 122 and an uncertainty value for the microseismic event with respect to each geophone 122. The computing device 124 can determine a total uncertainty value of a plurality of microseismic events over a period of time for each geophone 122 by summing the uncertainty value of each microseismic event monitored by each geophone 122.

The computing device can determine a gradient of an objective function for each of the plurality of geophones 122, the objective function can be based on the number of geophones 122 monitoring the microseismic events, the location of each geophone 122, the total economic cost of the fracturing operation (e.g., a budget for the fracturing operation), and the total uncertainty value. When the computing device 124 determines that the gradient associated with one of the plurality of geophones 122 exceeds a pre-set limit the location of that geophone 122 can be perturbed and the computing device 124 can receive updated raw signal data associated with additional microseismic events. The computing device 124 can determine an updated gradient of the objective function for the updated location of the geophone 122. The location of the geophone 122 can continue to be updated until the computing device 124 determines that the gradient of the objective function is less than or equal to the pre-set value.

When the computing device 124 determines the gradient associated with each of the geophones 122 is at or below the pre-set value the uncertainty associated with each geophone's raw signal data can be reduced. In some aspects, the computing device 124 can transmit a notification in response to determining that the gradient associated with each of the geophones 122 is less than or equal to the pre-set value. The computing device 124, may also store information associated with the location of each of the geophones 122 in response to determining that the gradient associated with each of the geophones is less than or equal to the pre-set value. The computing device 124 can receive the pre-set value from an input by a user.

In some aspects, the computing device 124 can control the position of the geophones 122 on the tool string 121. For example, the computing device 124 can transmit a command to move one or more of the geophones 122 along a length of the tool string 121. In some aspects, a separate controller can transmit a command to move the geophones 122 along the tool string 121. The controller can be positioned at the surface 114 or in another location and can be in communication with the computing device 124 via a wired or wireless communication link. In some aspects, the location of one or more of the geophones 122 monitoring microseismic events at a future planned wellbore can based on the determined gradient of the objection function for each of the plurality of geophones 122 positioned at the observation wellbore 118 of the current hydraulic fracturing operation.

Figure 2:
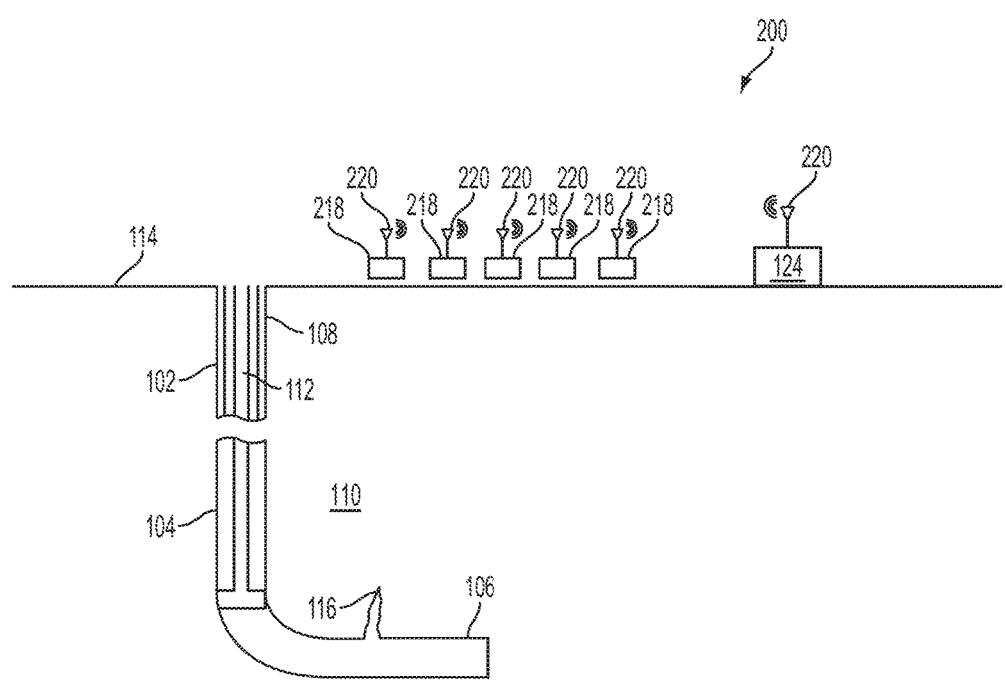
FIG. 2 is a schematic illustration of an active wellbore and a microseismic monitoring sensor uncertainty reduction system according to one aspect of the present disclosure.

FIG. 2 is a schematic illustration of a sensor uncertainty reduction system 200 according to one aspect. The wellbore 102 extends through various earth strata and has a substantially vertical section 104 and a substantially horizontal section 106. The substantially vertical section 104 has the casing string 108 cemented at an upper portion of the substantially vertical section 104. The substantially horizontal section 106 extends through the hydrocarbon bearing subterranean formation 110. Tubing string 112 extends from the surface 114 into the wellbore 102 and can provide a conduit for pumping a fracturing fluid into the wellbore 102 to perform hydraulic fracturing operations on the wellbore 102. The hydraulic fracture 116 extends from the substantially horizontal section 106.

The system 200 includes multiple tiltmeters 218 positioned at the surface 114. In some aspects, each of the tiltmeters 218 can be positioned in a shallow hole at the surface 114 proximate the lateral location of the hydraulic fracture 116. The tiltmeters 218 can monitor microseismic events in the formation 110. For example, the tiltmeters 218 can measure hydraulic fracture-induced deformations or microdeformations at the surface 114 using orthogonal tilt sensors. In some aspects, the tiltmeters 218 may measure microdeformations in the subterranean formation when positioned downhole in an observation wellbore.

The tiltmeters 218 are communicatively coupled to the computing device 124 via a wireless communication link 220. In some aspects, the communication link 220 can be wired. The computing device 124 can transmit data to and receive data from the tiltmeters 218 via the communication link 220. An example of the computing device 124 is described in further detail with respect to FIG. 3. The computing device 124 can receive data from the tiltmeters 218 related to a microseismic event in the formation 210 during a hydraulic fracturing operation. For example, the computing device 124 can receive measurements of hydraulic fracture-induced deformations or microdeformations at the surface 214. The computing device 124 can use the data received from the tiltmeters 218 to determine a location of the microseismic event. As described with respect to the system 100 of FIG. 1, the computing device 124 can determine a seismic ray path and uncertainty value for each of a plurality of microseismic events monitored by the tiltmeters 218. The computing device 124 can determine an uncertainty value of a location of the microseismic event determined by the computing device 124, and a total uncertainty value of all the microseismic events. The computing device can determine a gradient of an objective function for each of the plurality of tiltmeters 218, the objective function can be based on the number of tiltmeters 218 monitoring the microseismic events, the location of each tiltmeter 218, the total economic cost of the fracturing operation (e.g., a budget for the fracturing operation), and the total uncertainty value.

When the computing device 124 determines that the gradient associated with one of the plurality of tiltmeters 218 exceeds a pre-set limit the location of that tiltmeter 218 can be perturbed and the computing device 124 can receive updated raw signal data associated with additional microseismic events. The computing device 124 can determine an updated gradient of the objective function for the updated location of the tiltmeter 218. The location of the tiltmeter 218 can continue to be updated until the computing device 124 determines that the gradient of the objective function is less than or equal to the pre-set value.

When the computing device 124 determines the gradient associated with each of the tiltmeters 218 is at or below the pre-set value the uncertainty associated with the raw signal data of each tiltmeter 218 can be reduced. In some aspects, the computing device 124 can transmit a notification that in response to determining that the gradient associated with each of the tiltmeters 218 is less than or equal to the pre-set value. The computing device 124, may also store information associated with the location of each of the tiltmeters 218 in response to determining that the gradient associated with each of the tiltmeters 218 is less than or equal to the pre-set value. The computing device 124 can receive the pre-set value from an input by a user.

In some aspects, the computing device 124 can control the position of the tiltmeters 218 at the surface 114. For example, the computing device 124 can transmit a command to move one or more of the tiltmeters 218 at the surface 114. In some aspects, a separate controller can transmit a command to move the tiltmeters 218. The controller can be positioned at the surface 114 or in another location and can be in communication with the computing device 124 via a wired or wireless communication link. In some aspects, the location of one or more of the tiltmeters 218 monitoring microseismic events at a future planned wellbore can based on the determined gradient of the objection function for each of the plurality of tiltmeters 218 positioned at the surface 114 of the current hydraulic fracturing operation.

Figure 3:
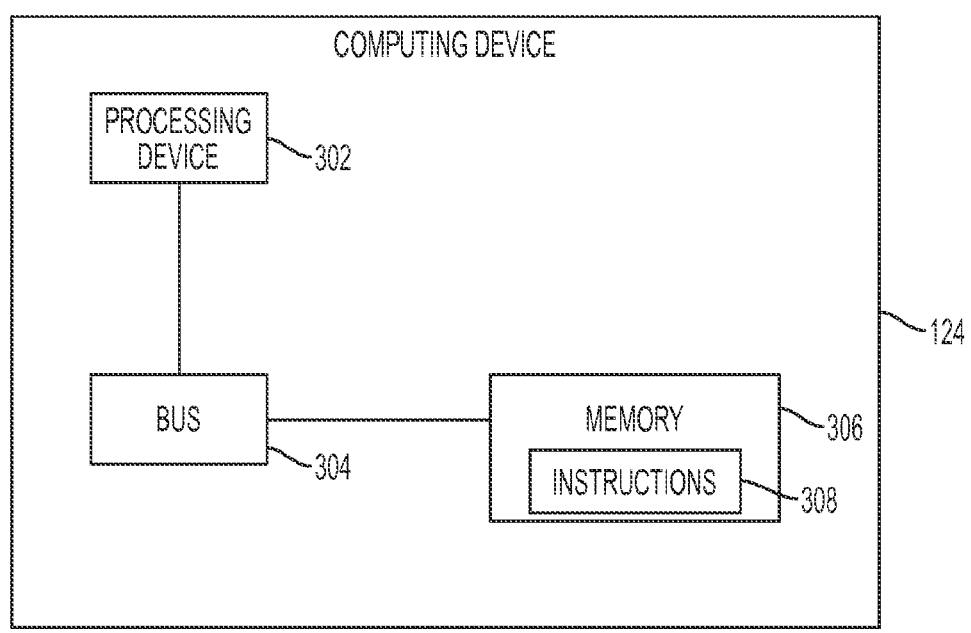
FIG. 3 is a block diagram depicting an example of a computing device for reducing uncertainty in microseismic monitoring sensor data according to one aspect of the present disclosure.

FIG. 3 is a block diagram depicting an example of a computing device 124 for determining an observed length of a hydraulic fracture and calibrating the fracture model according to one aspect of the present disclosure. The computing device 124 includes a processing device 302, a memory device 306, and a bus 304.

The processing device 302 can execute one or more operations for calibrating a fracture model. The processing device 302 can execute instructions 308 stored in the memory device 306 to perform the operations. The processing device 302 can include one processing device or multiple processing devices. Non-limiting examples of the processing device 302 include a Field-Programmable Gate Array ("FPGA"), an application-specific integrated circuit ("ASIC"), a microprocessor, etc.

The processing device 302 can be communicatively coupled to the memory device 306 via the bus 304. The non-volatile memory device 306 may include any type of memory device that retains stored information when powered off. Non-limiting examples of the memory device 306 include EEPROM, flash memory, or any other type of non-volatile memory. In some aspects, at least some of the memory device 306 can include a medium from which the processing device 302 can read the instructions 308. A computer-readable medium can include electronic, optical, magnetic, or other storage devices capable of providing the processing device 302 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc.

Figure 4:
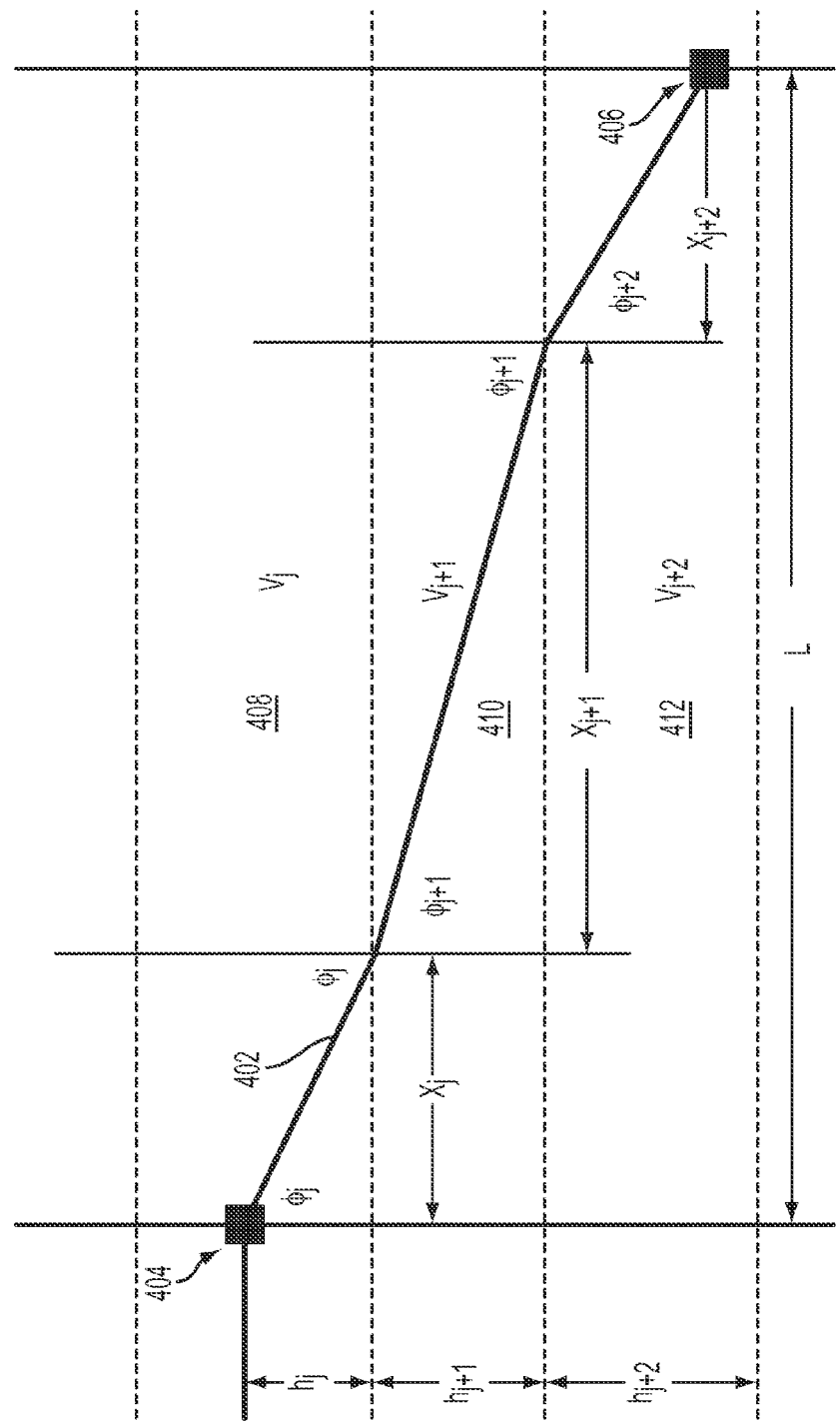
FIG. 4 is a schematic illustration of a ray path of a P-wave or an S-wave traveling through rock layers having different wave speeds according to one aspect of the present disclosure.

FIG. 4 is schematic illustration of a ray path 402 of a P-wave or an S-wave from a microseismic event location 404 to a sensor 406 through three rock layers 408, 410, and 412 having different wave speeds. The computing device 124 can determine the ray path 402 using the event microseismic event data, information about the formation (e.g. the number of rock layers with different wave speeds, the height of each rock layer, the wave speeds through each rock layer) and the microseismic monitoring algorithm. The vertical distance traveled by the P-wave and S-waves through each rock layer 408, 410, 412 between the microseismic event location 404 (inferred from the event data) and the sensor 406 is $h_j$, $h_{j+1}$, $h_{j+2}$, respectively. The wave speed or velocity of the P-wave and S-waves through each rock layer 408, 410, 412 is $v_j$, $v_{j+1}$, $v_{j+2}$, respectively. The angle of the ray path at each juncture of the rock layers is $\Phi_j$, $\Phi_{j+1}$, $\Phi_{j+2}$. The horizontal distance of the ray path through each rock layer is $x_j$, $x_{j+1}$, $x_{j+2}$.

Figure 5:
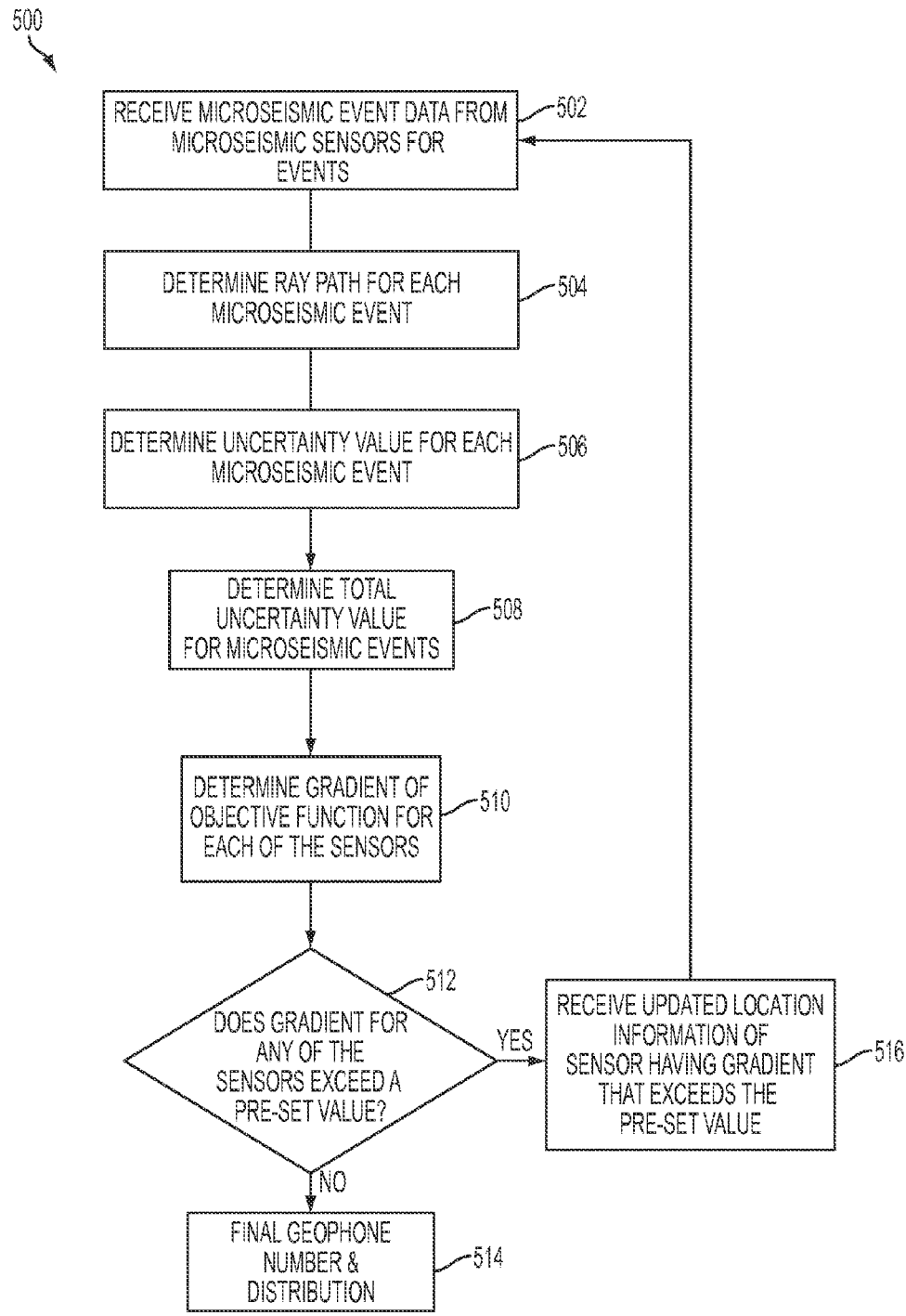
FIG. 5 is an example of a flow chart for a process of reducing uncertainty in microseismic monitoring sensor data according to one aspect of the present disclosure.

FIG. 5 is an example of a flow chart of a process 500 for reducing uncertainty of microseismic monitoring sensors according to one aspect of the present disclosure. The process 500 below can be completed in whole or in part by the computing device 124 shown in FIG. 3. At block 502 the computing device receives event data associated with microseismic events from sensors, for example geophones, in an initial position during a hydraulic fracturing operation. In some aspects, the computing device may receive the event data from tiltmeters or other sensors used to monitor microseismic events in a formation during a hydraulic fracture operation.

At block 504 the computing device uses the event data to determine the ray path from a location of each microseismic event to each sensor using a microseismic monitoring algorithm and additional information. For example, as shown in FIG. 4, the computing device can determine a ray path between a microseismic event source and a sensor through three rock layers of the formation having different wave speeds using the event data, information about the formation (e.g. the number of rock layers with different wave speeds, the height of each rock layer, the wave speeds through each rock layer) and the microseismic monitoring algorithm.

At block 506 the computing device determines an uncertainty value of the location of each of the microseismic events. The computing device can determine the uncertainty value of the location of each microseismic event as:

$$\sigma_L^2 = \Sigma_{i=1}^N v_i^2 \sigma_{\Delta Ti}^2 + (\Delta T_i)^2 \sigma_{v_i}^2$$

The term $\sigma_{v_i}^2$ is the uncertainty value of the i-th layer velocity, which is given a priori based on the information known about the formation. The term $\sigma_{\Delta Ti}^2$ is the uncertainty of the arrival time of the P-waves and the S-waves at the sensor, which can be based on the sensor and its signal processing technology. The computing device can receive information about the formation and the sensors from an input by a user to determine these values. For example, the computing device can receive input from a user identifying the number of rock layers having different wave speeds, the wave speeds of each layer, the sensor signal processing technology, and the type of sensor.

The total transmission time from the microseismic event location to the sensor can be described as $\Delta T = \Delta T_1 + \Delta T_2 + \Delta T_3 + \ldots + \Delta T_N$ where N is the number of rock layers. The computing device can determine the time needed to pass through each rock layer as:

$$\Delta T_i = \frac{h_i}{v_i \cos \phi_i}$$

where $h_i$ is the height of the i-th layer and $v_i$ is the velocity of the waves through the i-th layer. The angle $\Phi_i$ is based on the ray path determined by the computing device using the microseismic monitoring algorithm at block 504. An example of the ray path determined by the computing device is shown in FIG. 4.

In some aspects, the computing device can determine the uncertainty of a location of a microseismic event where multiple observation wells are used. For example, the computing device can determine the microseismic event location to be a weighted average from the sensors of the multiple observation wells. The weights can be the inverse of the distance of that sensor to the microseismic event (i.e., a sensor positioned closer to the microseismic event can have a larger weight).

At block 508 the computing device can determine the total uncertainty of all the locations of the microseismic events determined by the computing device. The computing device can determine the total uncertainty as: $\sigma^2 = \Sigma_{j=1}^M \sigma_L^2(j)$. The term $\sigma_L^2(j)$ is the uncertainty value for the j-th microseismic event of the microseismic events, where M is the total number of microseismic events.

At block 510 the computing device can, for each sensor, determine a gradient of an objective function that seeks to solve an optimization problem to minimize a cost function, uncertainty of sensor data, and number of sensors for a hydraulic fracturing operation. A constraint of the objective function can be based on the total uncertainty value determined by the computing device at block 508 and the number of sensors and their locations, and a total economic cost. The total economic cost can be a value associated with a budget for performing the hydraulic fracturing operation. The objective function can be: $\min_{L_1, \ldots, L_K} W_1 \sigma^2 + W_2 K + W_3 C$ where $L_1, \ldots, L_K$ are the locations of each of the sensors, K is the number of sensors, and C is the total economic cost, where each factor may be weighted by weights $W_1$, $W_2$, $W_3$. In some aspects, if sufficient information is known about the formation and the uncertainty of the arrival time of the P-waves and the S-waves at the sensor, the objective function can be solved directly. The computing device can subsequently receive updated sensor information, including sensor locations to continue to determine an optimal placement of the sensors as downhole conditions change or in some aspects the hydraulic fracture model is calibrated.

At block 512 the computing device can determine if the gradient of the objective function determined at block 510 for any sensor exceeds a pre-set value. In some aspects, the pre-set value can be 0.0001 or another suitable pre-set value that approaches zero. The pre-set value can be received by the computing device from input by a user. If at block 512 the computing device determines that the gradient associated with all sensors is less than or equal to the pre-set value for each of the plurality of sensors, then the process terminates at block 514 where the computing device can indicate the number of sensors and location of each of the sensors that resulted in the gradients for each being less than or equal to the pre-set value.

If at block 512 the computing device determines that the gradient associated with a sensor exceeds the pre-set value then the location of the sensor can be altered or perturbed and the computing device can receive information that may include the updated location of the sensor. In some aspects, the computing device can output a command to move the location of the sensor or the sensor may be moved manually and the computing device can receive information that may include the updated location of the sensor. The process can return to block 502 when additional microseismic event data is received from the sensors.

Figure 6:
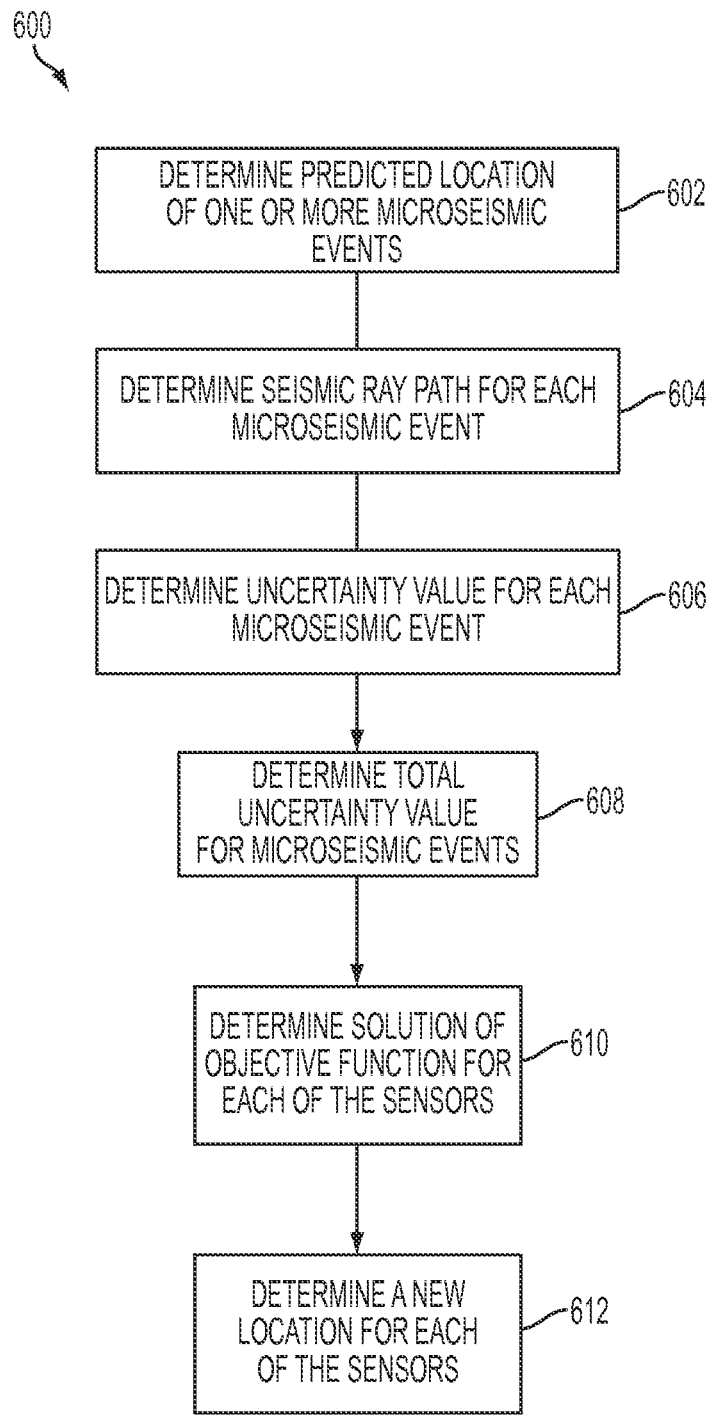
FIG. 6 is an example of a flow chart for a process of reducing uncertainty in microseismic monitoring sensor data according to one aspect of the present disclosure.

FIG. 6 is another example of a flow chart of a process 600 for reducing uncertainty of microseismic monitoring sensors according to one aspect of the present disclosure. The process 600 below can be completed in whole or in part by the computing device 124 shown in FIG. 3. At block 602 the computing device determines predicted microseismic event locations using a hydraulic fracture model.

At block 604 the computing device uses the predicted location to determine the seismic ray path from the predicted location of each microseismic event to each sensor using information about the formation (e.g. the number of rock layers with different wave speeds, the height of each rock layer, the wave speeds through each rock layer).

At block 606 the computing device determines an uncertainty value of the predicted location of each of the microseismic events. The computing device can determine the uncertainty value of the predicted location of each microseismic event as:

$$\sigma_L^2 = \Sigma_{i=1}^N v_i^2 \sigma_{\Delta Ti}^2 + (\Delta T_i)^2 \sigma_{v_i}^2$$

At block 608 the computing device can determine the total uncertainty of the predicted locations of the microseismic events determined by the computing device. The computing device can determine the total uncertainty of the predicted locations as: $\sigma^2 = \Sigma_{j=1}^M \sigma_L^2(j)$. The term $\sigma_L^2(j)$ is the uncertainty value for the j-th microseismic event of the microseismic events, where M is the total number of microseismic events.

At block 610 the computing device can, for each sensor, determine a solution of an objective function based on an economic cost, the total uncertainty of the predicted locations determined by the computing device at block 608, and the number of sensors. The objective function can be, for example: $\min_{L_1,\ldots,L_K} W_1\sigma^2+W_2K+W_3C$ where $L_1,\ldots,L_K$ are the locations of each of the sensors, $\sigma^2$ is the total uncertainty of the predicted locations, K is the number of sensors, and C is the total economic cost. Each factor may be weighted by weights $W_1$, $W_2$, $W_3$. The objective function can be solved directly where the total uncertainty value of the microseismic event locations is based on predicted locations determined by the computing device using the hydraulic fracture model. The solution of the objective function can be the optimal values of the locations of the sensors ($L_1,\ldots,L_K$).

At block 612 the computing device can determine a new location for each of the sensors based on the solution to the objective function. In some aspects, the computing device can transmit a notification that includes the new location for each of the sensors.

In some aspects, uncertainty of microseismic monitoring sensor data can be reduced. A computing device can receive information about at least one sensor that is monitoring a subterranean formation subsequent to a fracturing fluid being introduced. The information can include a location of the at least one sensor. The computing device can also receive information about a microseismic event in the formation being monitored by the at least one sensor and can determine a seismic ray path between a location of the microseismic event and the at least one sensor. The computing device can also determine an uncertainty value of the location of the microseismic event based on information about the formation and the information about the at least one sensor. The computing device can determine a total uncertainty value of the locations of a plurality of microseismic events and can determine a solution of an objective function. The objective function can be based on the total uncertainty value and a number of sensors. The computing device can determine a new location for the at least one sensor based on the solution.

In some aspects, a system can include a computing device that has a non-transitory computer-readable medium that has code executable for causing the computing device to receive information about at least one sensor that is monitoring a subterranean formation subsequent to a fracturing fluid being introduced. The information can include a location of the at least one sensor. The code can also cause the computing device to receive information about a microseismic event in the formation being monitored by the at least one sensor and can determine a seismic ray path between a location of the microseismic event and the at least one sensor. The code can cause the computing device to determine an uncertainty value of the location of the microseismic event that is based on information about the formation and the information about the at least one sensor. The code can cause the computing device to determine a total uncertainty value of the locations of a plurality of microseismic events and can determine a solution of an objective function. The objective function can be based on the total uncertainty value and a number of sensors. The computing device can determine a new location for the at least one sensor based on the solution.

In some aspects, a system can include at least one sensor and a computing device. The sensor can be for transmitting information about a microseismic event in a subterranean formation. The information can be transmitted subsequent to a fracturing fluid being introduced into the subterranean formation. The computing device can be for receiving information about at least one sensor that is monitoring a subterranean formation subsequent to a fracturing fluid being introduced. The information can include a location of the at least one sensor. The computing device can also be for receiving information about a microseismic event in the formation being monitored by the at least one sensor and can determine a seismic ray path between a location of the microseismic event and the at least one sensor. The computing device can also be for determining an uncertainty value of the location of the microseismic event that is based on information about the formation and the information about the at least one sensor. The computing device can also be for determining a total uncertainty value of the locations of a plurality of microseismic events and can determine a solution of an objective function. The objective function can be based on the total uncertainty value and a number of sensors. The computing device can determine a new location for the at least one sensor based on the solution.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method, comprising:
   receiving, by a computing device, information about—a plurality of sensors that are monitoring a subterranean formation subsequent to a fracturing fluid being introduced into the subterranean formation, the information including a location of each sensor of the plurality of sensors;
   receiving, by the computing device, information about a microseismic event in the subterranean formation being monitored by the plurality of sensors;
   determining, by the computing device, a seismic ray path between a location of the microseismic event and each sensor of the plurality of sensors;
   determining, by the computing device, an uncertainty value of the location of the microseismic event based on information about the subterranean formation and the information about the plurality of sensors;
   determining, by the computing device, a total uncertainty value of the locations of a plurality of microseismic events that include the microseismic event;
   determining, by the computing device, a solution of an objective function that is based on the total uncertainty value and a number of sensors; and
   determining, by the computing device and based on the solution, a new location to move at least one sensor of the plurality of sensors.

2. The method of claim 1, wherein the step of determining a solution of an objective function includes determining, by the computing device, a gradient of the objective function.

3. The method of claim 1, further comprising:
   determining the location of the microseismic event using the information about the microseismic event.

4. The method of claim 1, further comprising:
   determining the location of the microseismic event using a hydraulic fracture model.

5. The method of claim 1, further comprising transmitting, by the computing device, a notification that includes the new location of the at least one sensor of the plurality of sensors.

6. The method of claim 1, further comprising transmitting, by the computing device, a command to move the at least one sensor of the plurality of sensors to the new location.

7. The method of claim 1, wherein the objective function includes an economic cost and the solution to the objective function minimizes the economic cost.

8. A system comprising:
a computing device having a non-transitory computer-readable medium on which is code that is executable for causing the computing device to:
receive information about a plurality of sensors that are monitoring a subterranean formation subsequent to a fracturing fluid being introduced into the subterranean formation, the information including a location of each sensor of the plurality of sensors;
receive information about a microseismic event in the subterranean formation being monitored by the plurality of sensors;
determine a seismic ray path between a location of the microseismic event and each sensor of the plurality of sensors;
determine an uncertainty value of the location of the microseismic event based on information about the subterranean formation and the information about the plurality of sensors;
determine a total uncertainty value of the locations of a plurality of microseismic events including the microseismic event;
determine a solution of an objective function that is based on the total uncertainty value and a number of sensors; and
determine, based on the solution, a new location to move at least one sensor of the plurality of sensors.

9. The system of claim 8, wherein determining a solution of an objective function includes determining a gradient of the objective function.

10. The system of claim 8, the code being executable for causing the computing device to determine the location of the microseismic event using the information about the microseismic event.

11. The system of claim 8, the code being executable for causing the computing device to determine the location of the microseismic event using a hydraulic fracture model.

12. The system of claim 8, the code being executable for causing the computing device to transmit a notification that includes the new location of the at least one sensor of the plurality of sensors.

13. The system of claim 8, wherein the code is executable for causing the computing device to transmit a command to move the at least one sensor of the plurality of sensors to the new location.

14. The system of claim 8, wherein the objective function includes an economic cost and the solution to the objective function minimizes the economic cost.

15. A system comprising:
a plurality of sensors for transmitting information about a microseismic event in a subterranean formation, the information about the microseismic event being transmitted subsequent to a fracturing fluid being introduced into the subterranean formation; and
a computing device for:
receiving information about the at least one sensor, the information including a location of each sensor of the plurality of sensors;
receiving the information about the microseismic event being monitored by the plurality of sensors;
determining a seismic ray path between a location of the microseismic event and the plurality of sensors;
determining an uncertainty value of the location of the microseismic event based on the information about the subterranean formation and the information about the plurality of sensors;
determining a total uncertainty value of the locations of a plurality of microseismic events that include the microseismic event;
determining a solution of an objective function that is based on the total uncertainty value and a number of sensors; and
determining, based on the solution, a new location to move at least one sensor of the plurality of sensors.

16. The system of claim 15, wherein determining a solution of an objective function includes determining a gradient of the objective function.

17. The system of claim 15, the computing device also for:
determining the location of the microseismic event using the information about the microseismic event.

18. The system of claim 15, the computing device also for:
determining the location of the microseismic event using a hydraulic fracture model.

19. The system of claim 15, the computing device also for:
transmitting a notification that includes the new location of the at least one sensor of the plurality of sensors.

20. The system of claim 15, the computing device also for:
transmitting a command to move the at least one sensor of the plurality of sensors to the new location.

* * * * *